US012806878B2

(12) United States Patent
Gentil et al.

(10) Patent No.: US 12,806,878 B2
(45) Date of Patent: Nov. 24, 2026

(54) MEASURING TOOL AND METHOD FOR PROVIDING A COMPENSATION SHEET

(71) Applicant: BOBST MEX SA, Mex (CH)

(72) Inventors: David Gentil, L'Auberson (CH); Jean-Claude Ansermot, Estavayer-le-Lac (CH); Arnaud Morel, Arnex-sur-Orbe (CH); Thomas Serra-Tosio, Neuchâtel (CH)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 19/150,325

(22) PCT Filed: Jan. 31, 2024

(86) PCT No.: PCT/EP2024/052289
§ 371 (c)(1),
(2) Date: Jul. 23, 2025

(87) PCT Pub. No.: WO2024/160858
PCT Pub. Date: Aug. 8, 2024

(65) Prior Publication Data

US 2026/0216984 A1 Jul. 30, 2026

(30) Foreign Application Priority Data

Jan. 31, 2023 (EP) .................................... 23154122

(51) Int. Cl.
*B31B 50/00* (2017.01)
*B31B 50/14* (2017.01)
(Continued)

(52) U.S. Cl.
CPC .......... *B31B 50/006* (2017.08); *B31B 50/142* (2017.08); *B31B 50/20* (2017.08); *B31B 50/252* (2017.08); *B31B 2120/00* (2017.08)

(58) Field of Classification Search
CPC ..... B31B 50/006; B31B 50/20; B31B 50/146; B31B 50/252; B31B 2120/00
See application file for complete search history.

(56) References Cited

U.S. PATENT DOCUMENTS

2013/0267397 A1* 10/2013 Hoover .................. B31B 50/20 493/353
2018/0339483 A1* 11/2018 Oiwa .................. B26D 7/2614
2023/0373181 A1* 11/2023 Chun .................... B31B 50/005

FOREIGN PATENT DOCUMENTS

CN 109605482 A 4/2019
CN 215618412 U 1/2022
(Continued)

*Primary Examiner* — Eyamindae C Jallow
(74) *Attorney, Agent, or Firm* — Bookoff McAndrews PLLC

(57) ABSTRACT

A measuring tool (28) for a pressing station (16) of a cardboard processing machine (10), in particular a die-cutting and/or creasing machine, configured to be inserted between an upper platen (24) and a lower platen (26) of the pressing station, the measuring tool (28) comprising at least one sensor (30) composed of one or several distance sensors (32), the sensors (32) being configured to measure a vertical distance to a support surface (38) at a plurality of measuring points when the measuring tool (28) is inserted in the pressing station (16) and the pressing station is closed. Furthermore, a method for providing a compensation sheet (50) for a pressing station (16) of a cardboard processing machine (10) is provided.

9 Claims, 3 Drawing Sheets

(51) Int. Cl.

| | |
|---|---|
| ***B31B 50/20*** | (2017.01) |
| ***B31B 50/25*** | (2017.01) |
| *B31B 120/00* | (2017.01) |

(56) References Cited

FOREIGN PATENT DOCUMENTS

| | | | |
|---|---|---|---|
| DE | 3907826 | A1 | 9/1990 |
| DE | 102009056169 | A1 | 6/2011 |
| DE | 102013207309 | A1 | 10/2014 |
| DE | 102016108164 | A1 | 11/2017 |
| EP | 2327521 | A1 | 6/2011 |
| EP | 3153286 | A1 | 4/2017 |
| JP | H07124658 | A | 5/1995 |
| JP | 2008014925 | A | 1/2008 |
| JP | 2020110837 | A | 7/2020 |
| JP | 2021084190 | A | 6/2021 |
| WO | 9103358 | A1 | 3/1991 |

* cited by examiner

MEASURING TOOL AND METHOD FOR PROVIDING A COMPENSATION SHEET

CROSS-REFERENCE TO RELATED APPLICATION(S)

This application is a National Stage Application under 35 U.S.C. § 371 of International Application No. PCT/EP2024/052289, filed on Jan. 31, 2024, which claims priority to European Application No. 23154122.8, filed on Jan. 31, 2023, the entireties of which are incorporated herein by reference.

The invention refers to a measuring tool for a pressing station of a cardboard processing machine, in particular a die-cutting and/or creasing machine, and a method for providing a compensation sheet for a pressing station of a cardboard processing machine.

In cardboard processing machines, especially in die-cutting and creasing machines, a cardboard arranged in a feeding station is gripped and transported through a pressing station, a waste ejection station and a blanking station.

In the pressing station, a cardboard may be cut and creasing lines may be created. A creasing line is a compression of the cardboard where the cardboard is configured to be folded to create a box. To create a cut or creasing line, the pressing station has a lower platen and an upper platen arranged above the lower platen, wherein the platens are moveable towards each other. To each platen, a tooling plate may be attached which carries knives and/or creasing rules. Also, there may be a tooling plate that carries creasing counterparts corresponding to the knives and/or creasing rules.

To perform a cut or crease, the pressing station runs in cycles between an open position, where the platens are distant from each other, and a closed position where the knives or creasing rule apply pressure to the cardboard. After each cycle, when the pressing station is open, the cardboard is replaced by a new cardboard. The pressing station is configured to apply a predetermined pressure to the cardboard in the closed position.

To create an accurate cutting line, the pressure applied to the cardboard must be uniform. In particular, the distance between the plate and the knives must be very precise, for example in the range of a few hundredths of a millimeter.

The pressure to be applied is specific for different cardboard materials and for the shapes to be cut.

While cutting or creasing cardboard, high pressures may act on the plates of the pressing station, such that plates may be slightly deformed, which adversely affects the quality of the cut. Also, manufacturing tolerances of the plates or other machine tolerances may harm the quality of the cut.

Currently, when setting up a cardboard processing machine, a test cut is performed with the desired layout of knives. The test cut is inspected by an operator, and based on the result of the test cut, the operator will manually ad patches in the areas where the test cut has not been performed properly. The patches locally increase the thickness of the setup and thus compensate for the deformation of the plates. However, this procedure is time-consuming, creates waste, and requires an experienced operator.

In recent alternatives,_JP2020110837A describes the height adjustment of distance blocks of a mold, in particular, a deep drawing mold. The method uses a height adjustment based on the sensor output that detects the contact state between the distance blocks and an upper mold. In particular, based on the stress value of the sensor, a control unit can determine the height correction to apply.

It is thus an object of the present invention to compensate for inaccuracies in a pressing station in a cardboard processing machine in a simple and highly accurate manner.

This object is achieved by a measuring tool for a pressing station of a cardboard processing machine configured to be inserted between an upper platen and a lower platen of the pressing station, the measuring tool comprising at least one, but preferably a set of sensors with a plurality of distance sensors. The sensors are configured to measure a vertical distance to a support surface at a plurality of measuring points when the measuring tool is inserted in the pressing station and the pressing station is closed.

The measuring tool may comprise a plurality of sensor carriers. The distance sensors are respectively attached to a sensor carrier.

As an alternative, the plurality of distance sensors may be arranged according to a two-dimensional pattern, wherein the distance sensors are kept fixed on the measuring tool.

The support surface is for example a surface to which a tooling plate is usually attached when a cardboard sheet is processed in the pressing station. For example, the support surface is provided at the upper platen or lower platen of the pressing station or at an additional plate in the setup of the pressing station.

By measuring the vertical distance to the support surface, manufacturing inaccuracies or deformation of the components of the pressing station, in particular of the upper platen and the lower plate, can be detected.

The measuring tool allows the detection of such inaccuracies individually for different setups by simply inserting the measuring tool in the pressing station.

Measuring the distance at a plurality of measuring points has the advantage that a valid and accurate measurement value is obtained at every measuring point, even in such locations where the upper platen and the lower platen are not under pressure. Thereby, the quality of the compensation can be improved as well.

The measurement values of the vertical distance can be mathematically transferred into a pressure distribution if needed.

During the measurement, the pressing station is operated such that the measuring tool is clamped between the upper platen and the lower platen.

The measurement may be performed without using pressure or may be performed under pressure. When measuring under pressure, a set of elastic elements are added to the measuring tool. The elements can be attached to rails described later in this disclosure or may be standalone elements distributed across the measuring tool surface, in-between the distance sensors. The elastic elements apply a constant pressure between the upper platen and the lower platen when the measuring tool is clamped between them.

The measuring tool has for example a plate-like shape.

Based on the vertical distance to the support surface at the measuring points, a respective compensation sheet can be computed which can be superimposed with the upper platen or the lower platen. The compensation sheet compensates for the detected inaccuracies when the pressing station is regularly operated to process cardboard blanks. Thus, when using the compensation sheet, the accuracy of the pressure distribution in the pressing station is substantially improved. Consequently, the cardboard may be cut according to specification without any further adjustments.

According to one aspect, the plurality of distance sensors may be arranged according to a two-dimensional pattern. Each sensor measures the distance at a single location in the pressing station. The distance sensors are fixed in the measuring tool. The advantage of this aspect is a simple and robust measuring tool. Its disadvantage is that it requires a large number of sensors and a large number of connections.

According to a different aspect, the measuring tool may comprise a plurality of longitudinal rails and at least one distance sensor is guided linearly displaceable along each rail. Thereby, the measuring tool can be designed in a cost-efficient manner. More precisely, by providing linearly displaceable sensors, a plurality of measuring points can be covered by one single sensor, such that the number of sensors used in the measuring tool can be significantly lower compared to a measuring tool using only fixed sensors. One may use one sensor per longitudinal rail or may use a single sensor that is inserted into each rail in a sequence.

According to a different aspect, the measuring tool may comprise a least one rail, and at least one distance sensor is guided displaceable along the rail. The rail may, for example, have a shape that covers the surface of the platen, for example, the shape of a spiral.

For example, the measuring tool comprises a plurality of elastic elements that are arranged laterally displaced with respect to the distance sensors, wherein the elastic elements are configured to apply a vertical force to the sensor carriers when the measuring tool is clamped between the upper platen and the lower platen of the pressing station. By applying a vertical force to the sensor carriers, the elements of the measuring tool lean against each other, which improves the accuracy of the measurement. Preferably, the vertical force sets the pressing station in a state that is representative of its state during operation, i.e., in the same state as when the pressing station is used to cut cardboard sheets.

The elastic elements are for example foam elements or springs.

The elastic element can act directly or indirectly on the sensor carriers.

According to one embodiment, the elastic elements are attached to the longitudinal rails. That means that the elastic elements act indirectly on the sensor carriers. By attaching the elastic elements to the longitudinal rails, the longitudinal rails lean against the sensor carriers and vice versa when the pressing station is closed.

The distance sensors are for example capacitive sensors, inductive sensors, optical time of flight sensors, in particular laser sensors, optical triangulation sensors, or mechanical sensors. All of these sensors are suitable to measure a vertical distance with sufficient accuracy.

A mechanical sensor is for example a sensor that is deformed when the measuring tool is inserted in the pressing station and the pressing station is operated, wherein the deformation of the mechanical sensor after an operation of the pressing station is measured and thus allows to determine a vertical distance to a support surface. For example, the mechanical sensor has a plurality of deformable pieces of hardware which are placed at the measuring points. After operating the pressing station, the deformable pieces are removed from the pressing station and their height is measured. The deformable pieces can be made of lead.

The object is further achieved by method for providing a compensation sheet for a pressing station of a cardboard processing machine, in particular a die-cutting and/or creasing machine. The method comprises inserting an inventive measuring tool into the pressing station and operating the pressing station such that the measuring tool is clamped between the upper platen and the lower platen of the pressing station. The distance to a support surface is measured at a plurality of measuring points using the measuring tool while the measuring tool is clamped between the upper platen and the lower plate, and at least one compensation sheet with a varying thickness is computed for compensating a deformation of the upper platen and the lower platen during a pressing process based on the vertical distance to the support surface at the measuring points.

By means of the inventive method, inaccuracies of components of the pressing station which have any impact on the vertical distance to the support surface and thus adversely affect the cutting quality in a pressing station can be detected in a highly accurate manner. The compensation sheet computed based on the measured vertical distance can thus sufficiently compensate for the inaccuracies during a pressing process such that a uniform pressure distribution in the pressing station is achieved.

Further features and advantages of the invention can be derived from the following description and the enclosed drawings. In the drawings FIG. 1 shows a cardboard processing machine with a pressing station, FIG. 2 shows a pressing station with an inventive measuring tool in a schematic view, and FIG. 3 shows a section of the measuring tool in a schematic view.

Figure 1:
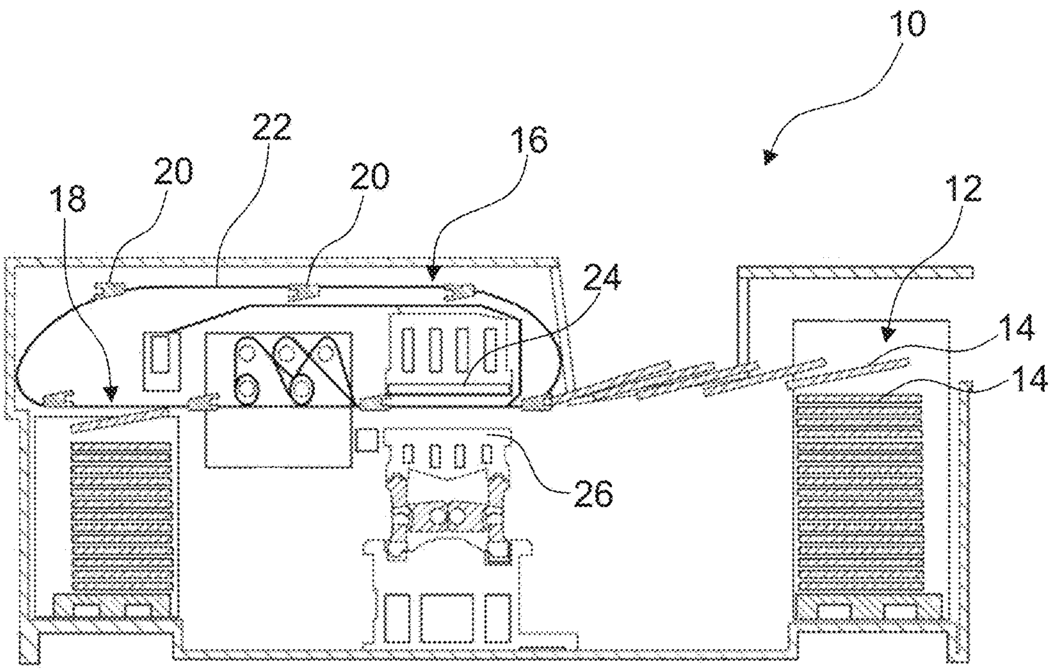
FIG. 1 shows a cardboard processing machine 10, in particular a die-cutting and/or creasing machine.

The cardboard processing machine 10 comprises a feeding station 12 in which cardboard blanks 14 to be processed are piled.

Further, the cardboard processing machine 10 comprises a pressing station 16 in which the cardboard blanks 14 are cut or creased.

In a piling station 18, the cardboard blanks 14 can be piled before they are withdrawn from cardboard processing machine 10.

The cardboard blanks 14 can be moved along a processing direction employing gripper bars 20, which are attached to a drive chain 22.

In the following, the pressing station 16 is described in more detail.

In particular, the pressing station 16 comprises an upper platen 24 and a lower platen 26. The upper platen 24 is arranged above the lower platen 26.

The platens 24, 26 are moveable towards each other to cut or crease a cardboard blank 14 arranged between the platens 24, 26.

In the exemplary embodiment, the upper platen 24 is fixed and the lower platen 26 is moveable. Thereby, the mechanism of the pressing station 16 is less complex.

In order to cut the cardboard blanks 14, a tooling plate carrying knives, which is not depicted in the Figures, may be attached to the upper or lower platen 24, 26.

Due to the high pressures acting on the upper platen 24 and the lower platen 26 during a cutting process, the platens 24, 26 may slightly deform when the pressing station 16 is actuated.

The deformation is for one part due to the size of the upper platen 24 and the lower platen 26, which is in the range of 1 $m^2$ to 2 $m^2$. For example, the outer dimensions of the upper platen 24 and the lower platen 26 are 760 mm×1060 mm.

Also, there may be inaccuracies due to manufacturing tolerances, for example about the flatness or the orientation of the upper platen 24 and the lower platen 26.

In order to compensate for these inaccuracies, the deformation and manufacturing tolerances have to be detected in a sufficiently accurate manner.

Figure 2:
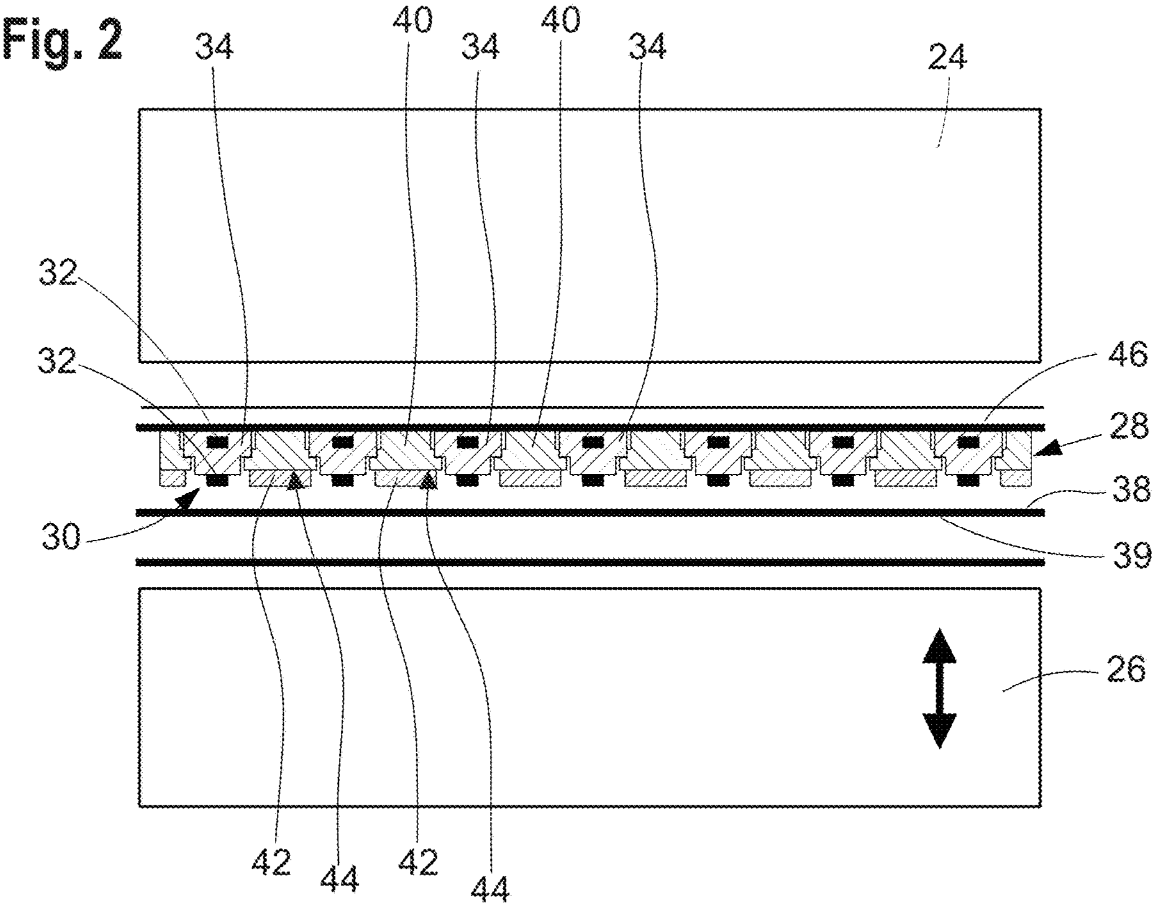

For this purpose, an inventive measuring tool 28 is provided, which is shown in FIG. 2.

The measuring tool 28 is configured to be inserted between the upper platen 24 and the lower platen 26 of the pressing station 16, as it is depicted in FIG. 2.

The measuring tool 28 comprises a sensor set 30 with a plurality of distance sensors 32 and a plurality of sensor carriers 34. The distance sensors 32 are respectively attached to a sensor carrier 34.

Figure 3:
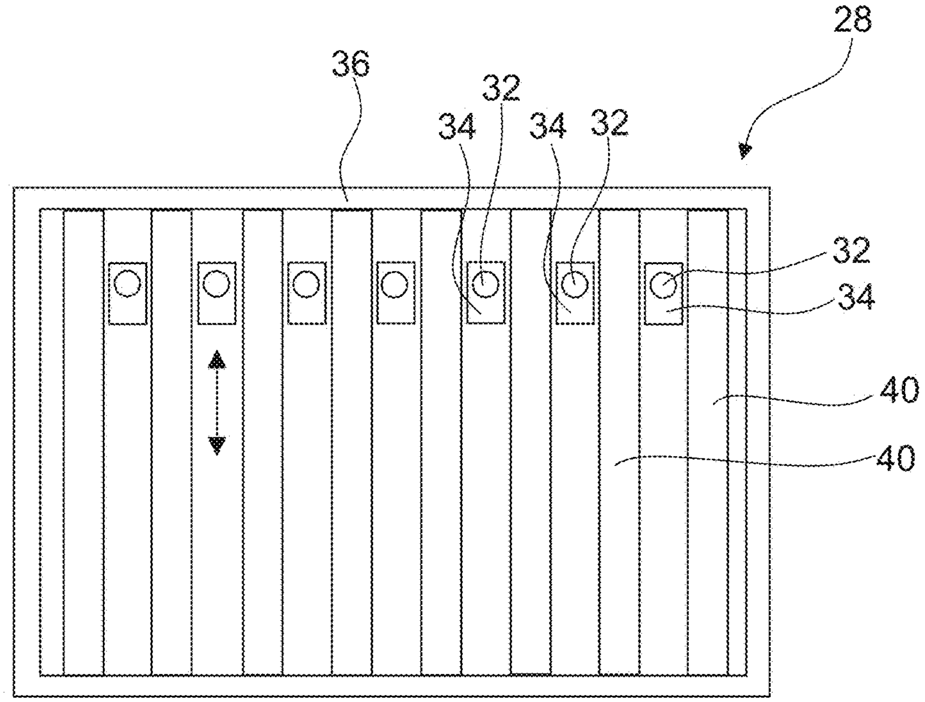

The sensor carriers 34 are attached to a frame 36 of the measuring tool 28 (see FIG. 3).

In the depicted embodiment, the sensor carriers 34 are linearly moveable within the frame 36, as will be described in more detail below.

However, it is also possible that the sensor carriers 34 are fixedly attached to the frame 36.

The sensors 32 are configured to measure a vertical distance to a support surface 38 at a plurality of measuring points when the measuring tool 28 is inserted in the pressing station 16.

The sensor carrier 34 may have one sensor 32, or two sensors 32 arranged head to toe. The latter is more precise since it can compensate for the guide rail 40 imprecisions.

The support surface 38 is provided at a plate 39 in the setup of the pressing station. However, the support surface 38 can also be provided directly at the upper platen 24 or lower platen 26.

For example, the sensors 32 are capacitive sensors, inductive sensors, optical time of flight sensors, optical triangulation sensors, or mechanical sensors. Preferably, the sensor is a contactless sensor, which makes him adapted to be displaced along the platen surface.

Using a sensor 32 that measures the distance directly is advantageous compared to a sensor that measures another physical parameter, for example, strain, and infers distance measurements. By using a distance sensor we avoid having to use a model, for example to convert strain to distance, and thus avoid an additional source of error, resulting in a more accurate result.

In the embodiment, the measuring tool 28 comprises a plurality of longitudinal rails 40 and at least one distance sensor 32 is guided linearly displaceable along each rail 40. More precisely, each sensor carrier 34 is respectively guided between two rails 40.

The longitudinal rails 40 also serve as suspension for the sensor carriers 34, i.e. the sensor carriers 34 are attached to the measuring tool 28 by means of the longitudinal rails 40.

By means of the sensor carriers 34 being displaceable along the rails 40, the number of sensors 32 of the sensor array 30 can be significantly reduced compared to a sensor array 30 with fixed sensor carriers 32. Ideally, we use one sensor 32 per rail 40, but we may also use a single sensor 32 and insert it into each rail 40 in a sequence.

In particular, in a measuring tool 28 covering a plate 24, 26 with a size of 760 mm×1060 mm, the sensor array 30 with moveable sensor carriers 34 for example comprises twenty sensors 32, while a sensor array with fixed sensor carriers 34 would require about four hundred sensors. Thus, by providing displaceable sensor carriers 34, the measuring tool 28 is particularly cost-efficient.

Figure 4:
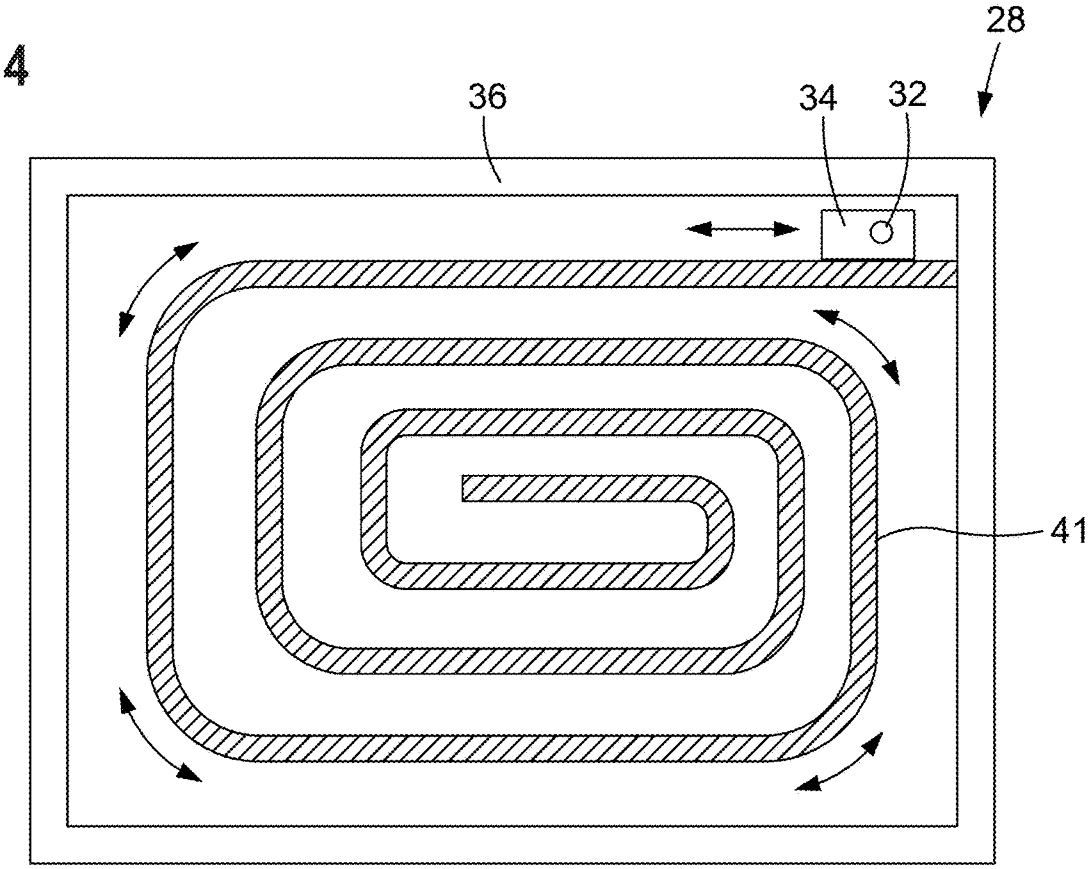
FIG. 4 shows a section of an alternative measuring tool in a schematic view.
Figure 5:
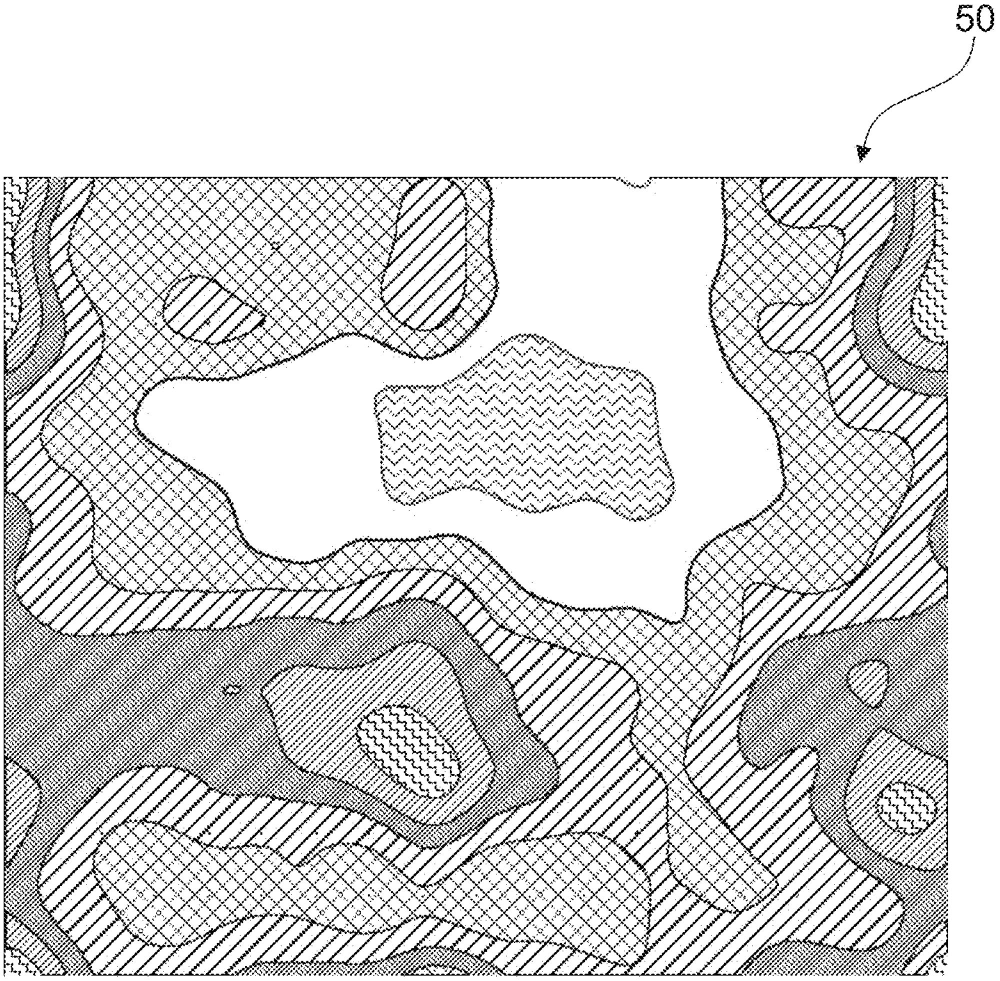
FIG. 5 shows an example of a compensation sheet.

An alternative to the implementation of longitudinal rails uses a rail 41 that covers the whole surface of the platen and is shown in FIG. 4. The sensor is attached on the side of the rail and is able to move along the whole rail, thereby covering the measurement of the complete platen in one iteration.

Another advantage of using displaceable sensor carriers 34 is that the measuring points can be very close to each other or even a continuous line is measured.

For displacing the sensor carriers 34, a linear drive can be provided which is not depicted in the drawings.

FIG. 3 shows a section through the measuring tool 28 illustrating the possible range of movement of the sensors 32.

The measuring tool 28 further comprises a plurality of elastic elements 42 that are arranged laterally displaced with respect to the distance sensors 32.

The elastic elements 42 are attached to the longitudinal rails 40, in particular to the bottom side 44 of the longitudinal rails 40.

For example, the elastic elements 42 are strips of foam that extend along the longitudinal rails 40.

The elastic elements 42 are configured to apply a vertical force to the sensor carriers 34 when the measuring tool 28 is clamped between the upper platen 24 and the lower platen 26 of the pressing station 16. In particular, the height of the elastic elements 42 is such that the elastic elements 42 are compressed when the measuring tool 28 is inserted in the pressing station 16. More precisely, the elastic elements 42 protrude beyond the sensors 32.

In the embodiment, when the elastic elements 42 are compressed, they apply a vertical force on the longitudinal rails 40 which in turn apply a vertical force on the sensor carriers 34 such that the longitudinal rails 40 and the sensor carriers 34 lean against each other.

The elastic elements 42 can be made very similar to the ones used to hold the cardboard next to the cutting knives during the normal operation of the press.

The sensor carriers 34 may lean against a support plate 46 of the pressing station 16.

Optionally, the setup of the pressing station 16 comprises additional plates which are schematically indicated in FIG. 2, but which will not be further described for reasons of simplicity.

Based on the measurement of the measuring tool 28, a compensation sheet 50 with a varying thickness can be provided, which can be added to the setup of the pressing station when the pressing station 16 is normally operated.

A method for providing a compensation sheet 50 for a pressing station of a cardboard processing machine comprises inserting a measuring tool 28 as described above into the pressing station, as it is depicted in FIG. 2.

The pressing station 16 is operated when the measuring tool 28 is inserted in the pressing station 16 such that the measuring tool 28 is clamped between the upper platen 24 and the lower platen 26 of the pressing station 16.

While the measuring tool 28 is clamped in the pressing station 16, the distance to the support surface 38 is measured at a plurality of measuring points using the measuring tool 28 while the measuring tool 28 is clamped between the upper platen 24 and the lower platen 26.

In particular, the sensor carriers 34 with the distance sensors 32 are displaced along the longitudinal rails 40 and measure the distance to the measuring points.

Afterwards, at least one compensation sheet 50 with a varying thickness is computed for compensating a deformation of the upper platen 24 and the lower platen 26 during a pressing process based on the vertical distance to the support surface 38 at the measuring points.

For compensating the deformation of the upper platen 24 and the lower platen 26 as well as manufacturing inaccuracies, the compensation sheet 50 is added to the setup of the pressing station 16.

The compensation sheet 50 can be made of metal and thus has high stability. It may also be made of glass fibers with resin, carbon fibers with resin, paper printed with polymer inks, or plastic.

The compensation sheet(s) 50 may be produced by an additive manufacturing technique or by subtractive manufacturing (engraving, etching, milling, etc). For example, the compensation sheet 50 is produced by 3D printing, or by chemical engraving, or laser engraving. Thereby, the compensation sheet 50 is produced with a particularly high thickness accuracy.

The compensation sheet 50 is individual for different pressing stations 16 and for each setup of the pressing station 16.

The invention claimed is:

1. A measuring tool for a pressing station of a cardboard processing machine, the measuring tool configured to be inserted between an upper platen and a lower platen of the pressing station, the measuring tool comprising:

at least one sensor including one or several distance sensors, the sensors being configured to measure a vertical distance to a support surface at a plurality of measuring points when the measuring tool is inserted in the pressing station and the pressing station is closed.

2. The measuring tool of claim 1, further comprising a plurality of sensor carriers, the distance sensors being respectively attached to a sensor carrier.

3. The measuring tool of claim 1, wherein the plurality of distance sensors are arranged according to a two-dimensional array, and wherein the distance sensors are kept fixed on the measuring tool.

4. The measuring tool of claim 2, wherein the measuring tool further comprises a rail, and at least one distance sensor is displaceable along the rail.

5. The measuring tool of claim 4, wherein the measuring tool further comprises a plurality of rails, wherein the distance sensor is linearly displaceable along each rail of the plurality of rails.

6. The measuring tool of claim 5, wherein the measuring tool further comprises a plurality of elastic elements that are arranged laterally displaced with respect to the distance sensors, wherein the elastic elements are configured to apply a vertical force to the sensor carriers when the measuring tool is clamped between the upper platen and the lower platen of the pressing station.

7. The measuring tool of claim 6, wherein the elastic elements are attached to the rails.

8. The measuring tool according to claim 1, wherein the distance sensors are capacitive sensors, inductive sensors, optical time of flight sensors, optical triangulation sensors, or mechanical sensors.

9. A method for providing a compensation sheet for a pressing station of a cardboard processing machine, the method comprising:

inserting the measuring tool according to claim 1 into the pressing station, operating the pressing station such that the measuring tool is clamped between the upper platen and the lower platen of the pressing station, measuring the distance to a support surface at a plurality of measuring points by means of the measuring tool while the measuring tool is clamped between the upper platen and the lower platen, and computing at least one compensation sheet with a varying thickness for compensating a deformation of the upper platen and the lower platen during a pressing process based on the vertical distance to the support surface at the measuring points.

* * * * *